(12) United States Patent
Zecos

(10) Patent No.: US 11,787,250 B1
(45) Date of Patent: Oct. 17, 2023

(54) NARROW VEHICLES AND JET AIRCRAFT VEHICLES

(71) Applicant: Polydoros Anthony Zecos, San Diego, CA (US)

(72) Inventor: Polydoros Anthony Zecos, San Diego, CA (US)

(73) Assignee: NJETVA INC., Poway, CA (US)

( * ) Notice: Subject to any disclaimer, the term of this patent is extended or adjusted under 35 U.S.C. 154(b) by 0 days.

(21) Appl. No.: 17/736,980

(22) Filed: May 4, 2022

Related U.S. Application Data

(63) Continuation-in-part of application No. 15/807,236, filed on Nov. 8, 2017, now abandoned.

(51) Int. Cl.
*B60F 5/02* (2006.01)
*B60N 2/01* (2006.01)

(52) U.S. Cl.
CPC . *B60F 5/02* (2013.01); *B60N 2/01* (2013.01)

(58) Field of Classification Search
CPC .. B60F 5/02; B60N 2/005; B60N 2/01; B62D 31/003; B62D 31/006; B60K 1/00; B60K 5/00; B60K 6/20; B60Y 2304/01; B60Y 2304/03; Y10S 903/902
USPC .......................................................... 180/89.1
See application file for complete search history.

(56) References Cited

U.S. PATENT DOCUMENTS

| | | | | |
|---|---|---|---|---|
| 1,752,441 A | * | 4/1930 | Lee .......................... | B60N 2/34 297/91 |
| 5,012,693 A | * | 5/1991 | Enomoto ................ | B60R 1/074 74/502.1 |
| 8,556,009 B2 | * | 10/2013 | Bartilson ................ | B60R 21/13 180/65.24 |
| 8,944,456 B2 | * | 2/2015 | Tsukerman ............ | B62D 21/14 280/638 |
| 8,950,796 B2 | * | 2/2015 | Woodhouse .............. | B60R 7/04 296/64 |
| 11,338,634 B1 | * | 5/2022 | Lacaze .................... | B64C 27/08 |
| 11,420,739 B2 | * | 8/2022 | Goelet ...................... | B64C 3/00 |
| 2007/0038422 A1 | * | 2/2007 | Wang ..................... | G06Q 50/04 703/8 |
| 2008/0048065 A1 | * | 2/2008 | Kuntz ..................... | B64C 37/00 244/17.23 |
| 2015/0105976 A1 | * | 4/2015 | Shikii ................ | B60H 1/00742 701/36 |
| 2016/0009320 A1 | * | 1/2016 | Ahn ......................... | B60J 7/143 280/639 |

(Continued)

*Primary Examiner* — William V Gilbert

(57) ABSTRACT

Thin, Narrow vehicles have a single front seat, the driver seat, and as a result are at least 25% narrower than current four-wheel vehicles that have two front seats.

Average US car occupancy rate is approximately 1.55 persons per vehicle mile, so narrow vehicles, comprising a non-adjustable width that is less than fifty-eight inches, a driver seat, and two seats in each back row, would provide increased seating options.

As a result of the reduced width and reduced weight of narrow four or more-wheel highway vehicles, the vehicle performance increases, and production costs, traffic congestions, parking unavailability, fuel consumption, and $CO_2$ emissions are reduced relative to a four-wheel highway vehicle.

Because of their reduced width, narrow vehicles allow for lateral room to incorporate two jet engines on the lateral sides, and wings that extend and retract laterally from the roof and/or the floor, to create jet aircraft vehicles.

13 Claims, 3 Drawing Sheets

(56) References Cited

U.S. PATENT DOCUMENTS

| | | | |
|---|---|---|---|
| 2016/0221472 A1* | 8/2016 | Deshmukh | B60N 2/01 |
| 2016/0272314 A1* | 9/2016 | Radu | B60F 5/02 |
| 2017/0072755 A1* | 3/2017 | Zhou | B64C 29/0033 |
| 2017/0217586 A1* | 8/2017 | Goelet | B64D 27/12 |
| 2019/0121371 A1* | 4/2019 | Russell | G05D 1/0022 |
| 2020/0172234 A1* | 6/2020 | Neff | B64C 29/0033 |
| 2022/0144140 A1* | 5/2022 | Kondrad | B60N 2/3047 |

\* cited by examiner

NARROW VEHICLES AND JET AIRCRAFT VEHICLES

CROSS REFERENCE TO RELATED APPLICATIONS

This application is a Continuation-In-Part of Utility patent application Ser. No. 15/807,236, filed Nov. 8, 2017, which is incorporated by reference herein in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR JOINT INVENTOR

I am the inventor of the above referenced application.
By: /Polydoros Anthony Zecos/Polydoros Anthony Zecos

BACKGROUND OF THE INVENTION

(1) Field of Invention

The present invention relates to the field of narrow, Thin, vehicles and narrow aircraft that are also vehicles.

(2) Description of Related Art Including Information Disclosed Under 37 CFR 1.97 and 37 CFR 1.98

(2. A) A Utility patent application for reducing by over 25% $CO_2$ vehicle emissions and gasoline consumption per mile and per passenger mile traveled, reducing vehicle production costs, and improving performance and vehicle safety by using narrow vehicles that have no front passenger seat, and have one and a child or two back passenger seats and thus are at least 25% narrower than current enclosed vehicles and thus at least 25% less costly and with over 25% increased mpg, with improved vehicle veracity i.e., traffic throughput and improved performance.

The field of invention is more efficient transportation by vehicles through increasing the gas mileage of new Thin, narrow vehicles by over 25% and reducing $CO_2$ emissions per mile by over 25% and reducing the cost of vehicles and reducing traffic congestions through 4 wheel enclosed Thin, Slim, narrow cars that have no front side-passenger seats and thus are about 55%-75% of the width of current four-wheel enclosed vehicles.

Current passenger cars are usually for at least four to five passengers, with the exceptions of some sports cars and the "smart car" "fortwo" that are for two passengers.

According to the 2001 NHTC published by the Bureau of Transportation Statistics: "In general, the weighted (by miles traveled in trip) occupancy rates of personal vehicle trips in the nation is 1.6 persons per vehicle mile (FIG. 9, table A-14.)" According to the same study the average number of passengers per car was 1.5 during workdays and 2.0 passengers per car mile during the weekends.

More recent data show average occupancy rate per vehicle of 1.55 in the US and around 1.54 in Europe.

Average car occupancy rates tables are on:
nhts.ornl.gov/tables09/fatcat/2009/avo_TRPTRANS_WHYTRP1S.html; and energy.gov/eere/vehicles/fact-613-march-8-2010-vehicle-occupancy-rates; and ntl.bts.gov/lib/58000/58800/58875/FHWA %20X0026--HIGHWAY %20PERFORMANCE %20MONITORING %20SYSTEM--CASE %20STUDY %20PROCEDURAL %20MANUAL %20-%20VEHICLE %20OCCUPANCY--013445

While UBER and other such companies may have changed or may change somewhat the car occupancy statistics there still should be a large segment for whom carrying only two extra passengers (beyond the driver) should be enough and such cars are not available. While there is an abundance of 2, 4, 5, 7 passenger vehicles there are no up to only 3 passenger or up to two passenger and a child, four-wheel enclosed cars available with gasoline or hybrid or electric or hydrogen and/or a jet engine, or preferably comprising two jet engines on the lateral sides, that as a result of being for only up to 3 passengers or for up to 2 passengers and a child only, have correspondingly reduced width and weight and consume less energy to transport said reduced weight.

Average car occupancy rates by purpose of trip are shown in:
nhts.ornl.gov/tables09/fatcat/2009/avo_TRPTRANS_WHYTRP1S.html The above tables of a 2009 study show that even the purposes with the highest mean car occupancy rates of "transporting someone" and of "social and recreational" purpose of 2.06 and 2.02 passengers per vehicle mile respectively, can be met with up to 2 passenger and a child and/or 3 passenger narrow cars. An article by Fortune Magazine of March 2016 is entitled: "Today's Cars Are Parked 95% of the Time."

Because of the only 5% usage of cars and the less than 40% car occupancy when used, current cars are too costly, consume unnecessarily high energy, cause traffic congestions and produce high $CO_2$ pollution, by their production, including by unnecessarily high content of steel, and car transportation per passenger mile is too inefficient.

There are also bicycles, motorcycles and tricycles for 1-4 passengers however those do not provide the air-conditioned comfort, enclosure safety, and the four-wheel stability of cars.

(2. B) Searches and Distinctions

Narrow cars are quite distinct from Formula racing cars which despite being for a single passenger, the driver, are as wide as the by regulation maximum of current cars i.e., 78" and are not enclosed. Also, narrow cars can carry a passenger and a child in the back seat and their application is not for racing but for work commute, with requisite comforts, durability, and lower costs.

As shown in the searches below there are single passenger enclosed small four-wheel cars which have an entrance from the trunk and their application is strictly for disabled people in wheelchairs not for highway commutes as these are intended.

A) kdsmartchair.com/blogs/news/26575619-kenguru-the-car-for-wheelchair-users
B) www.forbes.com/sites/michaelkanellos/2012/10/03/review-toyotas-single-seater-car/#168a458f507chttp://fortune.com/2015/03/20/bac-mono-race-car/
C) jalopnik.com/the-ten-craziest-single-seat-road-cars-508867493
D) www.carthrottle.com/post/the-5-coolest-single-seater-road-cars-ever-seen/
E) www.google.com/search?q=two+seater+cars+one+front+one+back&tbm=isch&tbo=u&source=univ&sa=X&ved=0ahUKEwj6_9WN4_PWAhUUSWMKHTe1CscQ7AkIRg&biw=1093&bih=530
F) www.google.com/search?rlz=1C2CHFX_enUS445US455&source=hp&ei=icz-Wci-O4LSjAOMzL-YBQ&q=renault+twizy+width+with+mirrors&oq=renault+twizy+width+with +mirrors&gs_l=psy-ab.12 . . . 1428.19373.0.22403.34.33.1.0.0.0.508.5182.4j23j3j1j0j1.32.0 . . . 0 . . . 1.1.64.psy-ab . . . 1.31.4547 . . 0j0i131k1j0i10k1j0i22i30k1j33i22i29i30k1j33i21k1j33i160k1.0._s0y9cBj33I
G) www.google.com/search?q=cars+with+one+front+seat+and+two+seats+in+the+back&tbm=isch&tbo=u&source=univ&sa=X&ved=OahUKEwj3t8rP7fPWAhVH92MKHYgbA7cQ7AkIMQ&biw=1093&bih=530
H) www.google.com/search?source=hp&q=three+seater+cars&oq=three+seat er+cars&gs_l=psy-ab.1.0.0j0i22i10i30k1j0i22i30k112.2685.8684.0.14937.17.17.0.0.0.0.130.1804.4j13.17.0 . . . 0 . . . 1.1.64.psy-ab . . . 0.17.1799 . . . 0i131k1.0.rn3RJqhqNxg
I) message.snopes.com/showthread.php?t=50059
J) www.trendhunter.com/slideshow/oneseater-vehicles.

Even though this claim is for vehicles that can have the option of gasoline or hybrid or electric or hydrogen engines, and in the case of aircraft vehicles, in addition to said engine having two jet engines on the lateral sides, and are intended as highway commute, because of the wheel chair car in search A, the Lamborghini Egoista concept car on search D and a Volkswagen single seater made out of light material and is electric, and an Elio Motors two seater in the images of search F) and a Renault TWIZI Minicompact car shown in search G that could potentially meet most of the specifications of narrow cars for single seat passenger cars and two seat passenger cars of New designs (not derivatives of current cars) single and two seater cars are specifically excluded.

None of these cars meet the specifications of the Utility Claim of being Slim, narrow vehicles, narrower than the narrowest four-wheel highway vehicle or 58" that have a driver seat and two passenger seats in each back row.

When said four-wheel vehicles are created by a method that is also claimed they have the same or basically the same, except potentially the wheels, driver side profile also referred to as side view or lateral view.

There are significant economies of scale in manufacturing and marketing a conventional four to five-seater vehicle along with a narrow derivative vehicle created from the same said four to five-seater vehicle, addressed to a different and currently unserved segment for cars for one or two or two plus a child or three only passengers (and through Slim SUVs the 4 to 5 seater segment) and sharing over 50% of the parts, by having the same lateral view and therefore the same lateral parts. The Claim of a method for Slim Derivative vehicles created from designs of conventional vehicles are not violated by any of the cars shown above or seen elsewhere.

The claims of new designs are for two passengers and a child and for vehicles with at least three seats.

None of the cars shown by the searches meet the specification of Utility Claim drawn to a vehicle for being for 2 passengers and a child and/or for 3 only passengers.

Searches of the USPTO data base for patents for "three-seater cars" and "cars with 3 seats" showed no matches found. Further searches through all the patents on cars showed no patent that matches our claims for a "method to derive a narrower car" from a current or future car design and found "0 patents" for "thin cars", for "Slim cars", for "3 passenger cars," for "single front seat cars" and for "cars for two passengers and a child."

The claims regarding narrow vehicles created by redesigning conventional vehicles, by the method above, are not for just removing one or two seats from a 4, 5 seater car and calling it a 3 seater nor about rearranging the seats of the car to make them 2 and child seaters or 3 seaters without reducing the width of the vehicle but rather involve the reduction of the width of the vehicle, as a result of having a single seat in the front, so that the width of the narrow vehicles is less than 58", which is chosen to be narrower than the narrowest four-wheel highway vehicle, (that is not dimensionally adjustable) that currently is 58".

Narrow vehicles have a minimum width of 40" because that is the minimum width needed to have two seats, or a bench seat for two, in the back.

Relative to current vehicles, because of the reduced by approx. 35% width, the weight, the engine size, the vehicle mileage, and given the data about passengers per vehicle, the vehicle mileage per passenger mile is increased by at least 25% and the $CO_2$ emissions even per passenger mile are reduced by at least 25%.

The reduction of traffic congestions is difficult to estimate because they depend on traffic regulations. While two current on average approx. 6 foot wide conventional cars cannot pass each other in the same 12 foot lane even at slow, less than 30 m/hr. speeds during traffic congestions, two on average about four feet narrow vehicles can (and can even move parallel to each other in the same lane;) and even two 58" wide (less than 5 ft.) cars can, so to the extent that this is deemed safe and allowed by traffic regulations, traffic throughput improvement, particularly during traffic slowdowns because of congestions, on the same roads, can be up to 100%.

Because of their reduced width, weight, narrow vehicles should be more maneuverable, i.e. have greater capacity and responsiveness to being steered or directed, and thus are safer and to the extent that the reduced width of 4 foot and less than 5 foot cars (rather than the current 6 foot width cars) in 10 or 12 foot lanes isn't used to increase car traffic throughput or vehicle veracity, which is the number of vehicles that can traverse a road system, it allows the vehicles more width space which should contribute to increased safety.

The safety of the narrow vehicles is improved relative to the wide conventional vehicles, because of increased maneuverability, increased width road space to maneuver, reduced surface area for frontal collisions, increased lateral rigidity because of the reduced width, and because the battery track packs or fuel cell tracks under the floor, increased acceleration and increased deceleration because of their reduced weight, and are safer for the passengers because of the absence of the front passenger seat which is the seat that results in most harm from collisions.

Narrow four or more-wheel vehicles are not dimensionally adjustable in terms of width. Said vehicles are adjustable in terms of length by adding back seating rows. Jet Aircraft vehicles are dimensionally adjustable by the extension and retraction of their wings.

Narrow vehicles, and Jet Aircraft vehicles which have a narrow body frame, are designed manually or by a computer assisted design program or a Computer-Aided Design, CAD, program but are not designed by any computer-implemented method or system for designing a vehicle package, and particularly not a computer-implemented program for methods and systems that utilize a mechanical vehicle package model because there is no need for it and because there are no mechanical narrow vehicle package models and no computer data with which to compare the results by a computer implemented method.

The reduction by over 25% of emissions, fuel and/or electricity cost per mile, costs per passenger mile, production costs and reduction in traffic congestion are valid for all (about half width, 65% or so) Thin, narrow vehicles with gasoline engines, hydrogen engines, for driver-less vehicles and for by lighter weight material vehicles and these benefits are increased significantly when Thincars, narrow vehicles, are implemented for or through Hybrid and/or Electric engines, by increasing their range by over 25%, relative to their conventional vehicle equivalents.

BRIEF SUMMARY OF THE INVENTION

Given modern GPS and modern communications the need for a front side-passenger to help navigate has greatly diminished.

This invention contains two components that are integral to each other.

a) Narrow four or more wheel Vehicles with only one seat in the front and two seats in each row in the back, with 0 or a multitude of back rows, that are modularly designed and manufactured replicas of the first back row, wherein the four or more wheel narrow vehicles are designed either independently or as modifications of current vehicles that have a width that includes the whole front dashboard, the front, driver seat, the back seat behind the driver seat and the middle back seat. The advantage is having much reduced energy consumption given that the average occupancy of a vehicle is 1.5 people and most rarely if ever use more than three seats, and b) because the vehicle is narrow, and narrower than the narrowest current four wheel vehicle that is 58", it allows enough width room, in the critically constrained by width highway lanes and roads, to have wings extending and retracting from the roof and/or floor of the vehicle and also have two jet engines attached on the sides of the vehicle and thus create flying jet aircraft highway vehicles, that can take off and land within a highway lane. In one aspect, because there may not be a need for two jet engines, one engine maybe mounted on the roof, or with a mounting structure over the back trunk.

In one aspect, four smaller jet engines are mounted two on the left side, one next to the front hood, and one next to the back trunk, and two on the right side, again one in the front side and one in the back side, i.e., in front and in the back of the passenger compartment.

In another aspect, wherein said vehicle comprises four said jet engines, above said wheels, one on the right lateral front side, one on the left lateral back side, one on the right front lateral side and one on the left back lateral side of said jet aircraft vehicle, wherein said jet engine enclosure structures of said jet engines on the front sides is tilted by 5 to 25 degrees, to reduce the take-off and landing distance required for the vehicle to achieve flight.

In the case of the two jet engines, such as those for example by Pratt and Whitney in Canada that maybe included that are 16" wide each, and can lift as in the case of a Cessna about 5000 lbs., while these four or more-wheel highway narrow jet aircraft vehicles with three seats or five seats, made with light materials are estimated to weight with the engines and wings about 1200 lbs.-4000 lbs., so they will work and be able to lift and fly and land even within a regular 10 feet road lane, and in a highway 12 feet lane or in the worst case in two lanes, if further in terms of width wing extensions and retractions are necessary under certain weather conditions.

In one aspect on the roof of the passenger back compartment, and/or compartments there is a parachute that releases under certain conditions.

Road limitations causing congestions are critically limited in terms of widths not length, and not height. A part of the evidence of the relative criticality of width for vehicles, necessitating narrow four-wheel vehicles, relative to the other dimensions of height and length, are the maximum dimension requirements by Federal law, which for width are 8 and a half feet, (102",) for height 13 and a half feet, and for length there are no Federal requirements, yet most State requirements are for 65 feet; more than 7 times as much as the maximum width. A utility claim is for a narrow vehicle by the equivalent of vertically cutting 25%-45%, which could be up to 50% particularly for driverless vehicles without a steering wheel, and in most cases is about 35% of any vehicle or designing new narrow vehicles, so that there is no front passenger seat but only: the driver seat, the back seat behind the driver seat, and the back middle seat, or the driver seat and two seats in each by back row, having a multitude of back rows.

The NEW narrow Thincar™ having at least 25% less weight than a 2 or 4 door "sedan" without compromising car safety by maintaining the equivalent weight for its size, and still being able to carry the driver, an adult passenger on the back seat, and a child or for 3 adult passengers should be able to meet the transportation needs of a large segment who would use the Thincar™ mostly for commute to work and do not need transportation of more than 3 persons at a time.

For three persons and two children, or five seat transportation, about half-width, in the case of narrow driverless vehicles but for driver driven vehicles about 35% narrower Thin, Slim, narrow 3 Row SUVs could be used.

An example of a single seat Slim car derivative of a current car that would be about 35% slimmer, because of no front passenger seat, is of the "smart" (fortwo) cars, which are approx. 65" wide.

All current and future models of Thin, narrow vehicle derivatives by a method described below, are claimed including for single seat and 2 seats and 2 and a child and 3 and 4 to 5 seats.

Claims are for new designs of narrow vehicles that have three seats and are less than 58" wide; and for at least three-seater vehicles, with two seats in each back row, with multitudes of back rows, that have a non-adjustable width of less than 58".

New designs of iterations of single seat and two seat narrow Personal cars™ that have the same length as the Thincars™, Narrow cars™, but have only one, the driver, seat which may recline into a bed, when parked, and have room for things such as a table, particularly for driverless cars, are also claimed.

Utility claims

1) A method for creating a narrow vehicle, from any vehicle design, such as a car, or passenger truck or SUV an design, wherein said narrow vehicle, thin car, or passenger truck or Slim SUV is at least 25% less wide than the current vehicle, car, or passenger truck, or SUV, has a single front seat (for the driver), may carry 1 and up to 11 passengers, and is 40"-58" wide.

The narrow vehicle method, to redesign a four-wheel to create a narrow vehicle from the interior of the vehicle: To re-design any current or future conventional vehicle into a Thin, Slim, Light, narrow vehicle, car, SUV easier, the in between seats width i.e., between the driver seat and front passenger seats is included and the full width of the front dashboard is included. Also, the middle back seat is included that is usually very similar to the width of the front dashboard, if not, the wider of the two is chosen, and that sets the minimum width required for the Slim vehicle derivative.

"In, 2007, the average mid-size sedan was 190 inches long and 71.4 inches wide." The narrowest car (all of whom have a front passenger seat) found currently in our searches are in Europe at 58".

If a vehicle has two seats in the front it is impractical to create it narrower than 58" because the elbow room for the driver becomes hazardously narrow.

Motorcycles' widths range from 28" to 39".

The method above for narrow vehicles would make their average width about 48" and the width range of the four-wheel enclosed passenger narrow vehicles such as Thin cars, Slim SUVs, and passenger trucks from 40" to 58".

The difference of maximum widths of current vehicles vs. narrow vehicles is 78"-58" divided by 78" is 27%, i.e., over 25%.

2) New designs of narrow vehicles for up to 2 passengers and a child, and/or 3 passengers, without front side-passenger seat whose non-adjustable width ranges from 40" to 58". Examples are shown in FIG. 2 and in FIG. 3. Also, new designs of narrow vehicles with at least 3 seats, comprising a driver seat and more than one back row, with two seats or a bench seat for two, in each said back row, are claimed.

Each back row compartment with two seats contains battery packs below the floor to support powering said modularly designed and manufactured back seat passenger compartment.

Narrow vehicles allow for the reduction of traffic congestions. The reduction of weight of the vehicle, and the reduced surface air displaced by the motions of narrow vehicles, by the reduction of their width, is further reduced by designing and manufacturing only the hood, the trunk and in some cases the roof of narrow vehicles by lighter than steel materials, which further lower the center of gravity of narrow vehicles increasing their stability and lowering their energy consumption per mile.

The reference character 3, in FIG. 3B shows the jet engine enclosures on which two jet engines are mounted, one on each lateral side.

An aircraft vehicle, that has a narrow body, frame, of less than 58", excluding the two jet engines on the sides, and has no passenger seat in the front, other than for the driver, is claimed; See FIG. 3.

Our patent and car searches did not show any method or any cars that meet these specifications.

Compensating for potential tipping issues, because of the reduced width, on turns at high speeds can be done by keeping the same wheels and suspensions rather than decreasing them also by about 35%.

The tipping issues are likely to be more prominent for Slim car derivatives or new designs of SUVs that are generally quite taller but not much wider than 4 to 5 passenger Sedans.

By maintaining the wheels and suspensions at the same size as of those of the original car, rather than reducing them also by about 35% and because Narrow vehicles have more road width room to take turns less tightly we estimate that there will be not be greater tipping issues of the Slim car derivatives relative to the those of the original cars and/or to current SUVs however the above needs to get tested prior to commercializing specific narrow vehicles.

If there are remaining tipping issues they may be resolved by reducing the diameter of the wheels about 1" to lower the center of gravity, (for SUVs it may need to be 2"), which is compensated by the reduced maximum weight that the car has to carry, and/or increasing the width of wheels by as much as an 1" relative to those of the current conventional vehicle from which it is created, if appropriate for safety. The increase in the width of wheels, if needed, would preferably be towards the inner direction of the vehicle rather than extending outside the frame and increasing the width of the vehicle.

If there are remaining height/width related tipping safety issues the maximum speed of the vehicle should be reduced to 80 mph. by using a smaller (in volume) by more than 35% engine probably a 50% smaller engine and if appropriate for increased safety by as much as 75% smaller engine.

To increase room in the hood for the engine, if necessary for room for the engine and/or for increased front bumper sizes—by adding an optional factory installed plastic or rubber additional and attached to the current front bumper, to increase safety, which could be an option for any vehicle, since the primary road constraint is width not length, —the engine hood length may be increased and/or the batteries may need to be moved to the trunk or at the bottom of the car, if appropriate for increased safety.

The vehicle length and height of a narrow vehicle maybe increased relative to a four-wheel vehicle because the critical dimension for roads is width, not length. The height of the narrow vehicle may be increased relative to a four-wheel vehicle for several reasons including to increase the suspensions and/or to allow for standing room in the passenger cabin.

Because Narrow vehicles may have a multitude of seating rows and their length and height may be increased relative to current conventional vehicles, even when created by a redesign of current vehicles, Narrow vehicles are not necessarily smaller than the current conventional vehicles, in fact they may be larger.

In the case of jet aircraft highway vehicles, the vehicle width is also increased by the addition of two or more engines on the lateral sides of said vehicle with a narrow passenger compartment and by the addition of extending and retracting wings, that slide out and in, and may contain smaller wings that slide out and in from the roof and/or the floor of the aircraft vehicle.

Cars, passenger trucks, Vans and SUVs are designed as family vehicles. The design of a structure of only a driver seat in the front, and two seats in each back row, or added back row, is a design of a personal vehicle, and for a vehicle and jet aircraft, that may carry other passengers, and its primary function is work commute. Relative to motorcycles and tricycle cars, the Thin, Slim, narrow vehicles have the advantages of being enclosed with the resulting comforts as air conditioning, radio, etc. of cars maintained, and are safer by maintaining as much weight, steal etc. as current cars have per passenger, and by maintaining the safety and stability of having four or more wheels relative to just two or three wheels.

BRIEF DESCRIPTION OF THE SEVERAL VIEWS OF THE DRAWINGS

The Drawings included are.

FIG. 1A is a lateral view from the driver side of a current conventional two door vehicle showing its length at 4065 mm or 160 inches.

FIG. 1B is its frontal view showing its width at 1728 mm or 68".

FIG. 1C is a top-down view of this vehicle.

FIG. 1D is a horizontal view from the back of the vehicle.

Figure 1A:
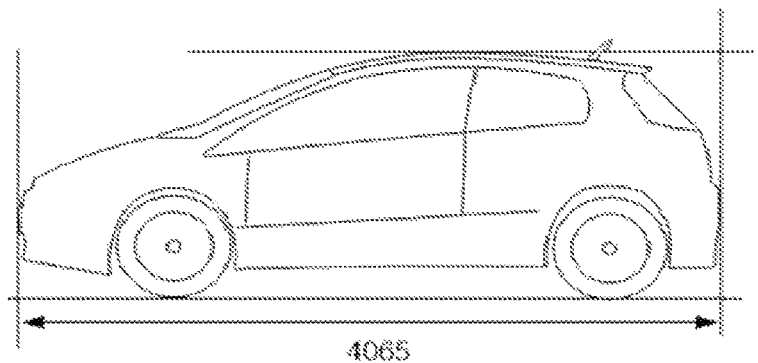
FIG. 1A, FIG. 1B, FIG. 1C, FIG. 1D
FIG. 2A, FIG. 2B, FIG. 2C, FIG. 2D
FIG. 3A, FIG. 3B
FIGS. 1A, 1B, 1C and 1D show 4 different views of a current model of a 5 passenger 2 doors car with the relevant dimensions in mm.

The redesigned creation from this vehicle, for a single front seat and a back passenger and a child, narrow vehicle is shown in FIGS. 2A, 2B, 2C, 2D FIG. 2A remains the same as in FIG. 1A.

Figure 2A:
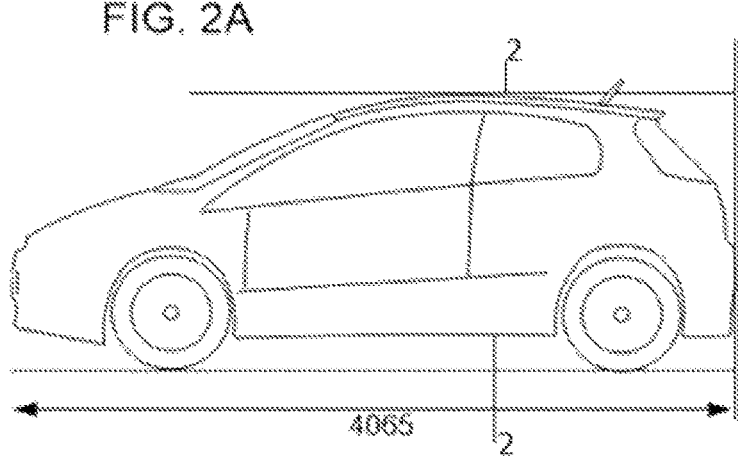
Figure 2B:
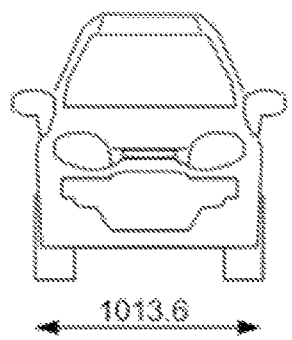

FIG. 2B is the frontal view of the created narrow vehicle, without a front passenger seat showing its width reduced from 1728 to 1013.6 mm. i.e., to approx. 40", a reduction by approx. 41%.

Figure 2C:
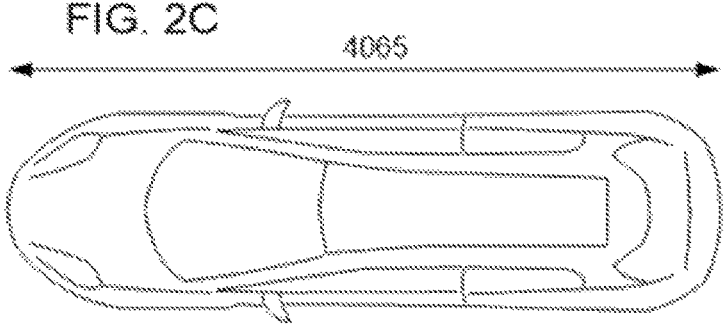

FIG. 2C shows the top-down view of the created narrow vehicle showing that the length stays the same at 4065 mm.

Figure 2D:
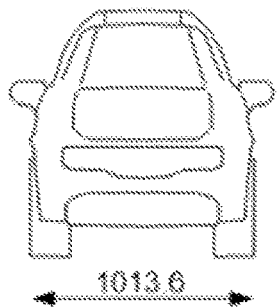

FIG. 2D is the horizontal view from the back of the narrow vehicle showing its width from the back at 1013.6 mm i.e., approx. 40".

Figure 3A:
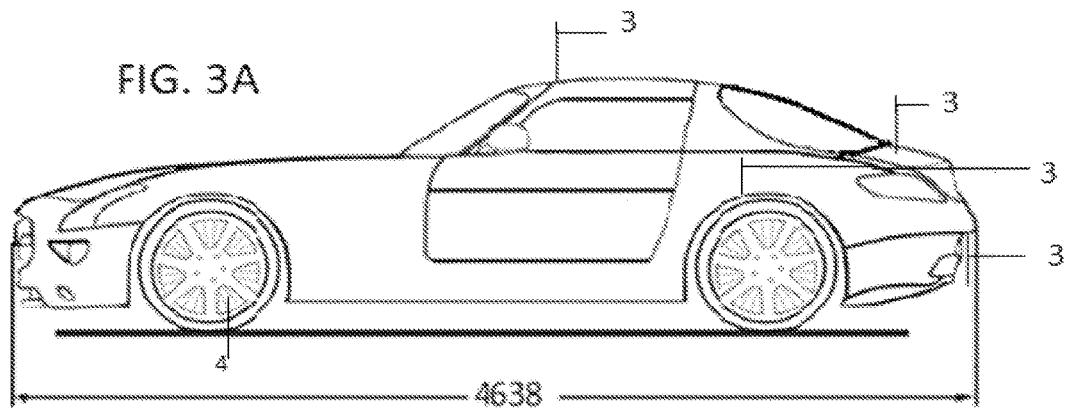
Figure 3B:
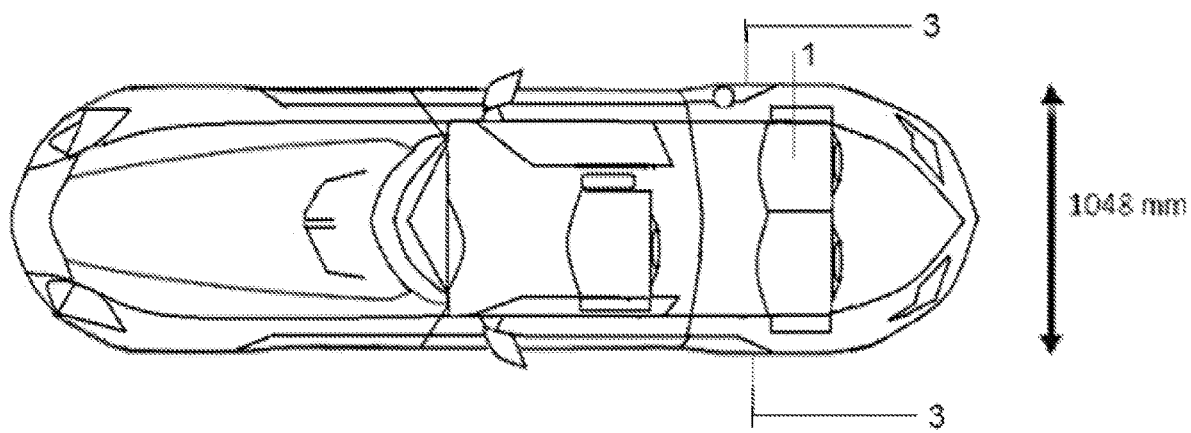

FIGS. 3A and 3B show a two-door Thin, new narrow vehicle design for up to 2 passengers and a child whose width, excluding the mirrors, is 1048 mm or 41.2".

FIG. 3A shows a lateral view, showing the length of the narrow car at 4638 mm or 182.6," and wherein said narrow vehicle is a jet aircraft vehicle, having one or more jet engines, shown by the references 3, illustrating through a line, each of the locations where a jet engine or two jet engines could be mounted on or enclosed within, and by reference 4, it illustrates radial blades that rotate from parallel to the wheels, to perpendicular to the wheels.

FIG. 3B is a top-down view, to illustrate its interior including the back passenger seat and child seat next to it by reference 1, and its fixed width of 1048 mm or 41.2," and by the reference 3, it illustrates through a line, the locations on the lateral sides where two jet engines are mounted on, for the cases that said vehicle is a flying vehicle, i.e., a jet aircraft vehicle.

DETAILED DESCRIPTION OF THE INVENTION (j. A) Narrow vehicles are not necessarily smaller versions or smaller in size relative to conventional vehicles, because in some cases they can be longer, as is the case for increasing the engine size, or for adding back seating rows, by replicating the back row or for adding fuel or other storage, or for materials transportation space, in some cases they may be taller, i.e., have increased height, and in the case of narrow body aircraft vehicles they are wider, and thus larger in overall size.

The four or more wheel narrow vehicles, or single front seat vehicles, or personal vehicles, that have a width of in between 40" to 58", even though they are narrower relatively to the current four or more wheel highway vehicles, they can be longer by having more back seat rows, that in one aspect can be modules, that slide and lock in between the front compartment that includes the engine and the front passenger seat, i.e., the driver seat, of one or a multitude of back seat row or rows, that in one aspect maybe installed and removed by any dealership, and the back compartment that includes storage, including of fuel and of batteries, and other storage, that may also include the a jet engine of each of the sides, and as result be even bigger in terms of overall size, relatively to the equivalent vehicle with two seats in the front, and still have the advantages increased vehicle veracity resulting in reduced traffic congestions or jams, improved parking availability and reduced energy consumption per passenger mile, relative to current four-wheel vehicles.

Also, in some cases narrow vehicles, that have a narrow body i.e., narrow frame, are wider than conventional vehicles by the addition two jet engines, one on each lateral side of said narrow vehicle and by the addition of extending and retracting wings, that slide out and slide in from the roof and/or the floor of the narrow four or more-wheel vehicle. The sliding out and in wings further comprise of smaller sliding out and in wings, that can rotate up to 90 degrees to operate as flaps and slats.

In one aspect, the enclosure structures of the two jet engines, illustrated on FIG. 3B, reference 3, on the lateral sides, are also wings that further comprise a rotor and/or a vertical stabilizer and/or a horizontal stabilizer.

Because of the increased length of narrow four or more-wheel vehicles relative to said four or more-wheel vehicles, in some cases, and because of their increased overall width, in the case of narrow frame aircraft vehicles, narrow four or more-wheel vehicles are in those cases larger in vehicle size than said four wheel-vehicles.

Vehicle performance is traditionally measured by vehicle acceleration, by maximum speed, and by vehicle deceleration.

Because vehicle acceleration and vehicle deceleration are directly dependent on the vehicle weight, and because narrow vehicles, because of the reduced non-adjustable width, mostly have reduced weight, when the engine size, the brakes and the wheels are the same as those of said four-wheel vehicle, vehicle acceleration and vehicle declaration for narrow vehicles is increased relative to said four-wheel vehicle.

A narrow four-wheel vehicle having an aerodynamic surface air displacement reduced by its motions, has reduced energy consumption per mile, and as a result causes reduced $CO_2$ emissions per mile, relative to said four-wheel vehicle.

A common vehicle performance criterion is maximum speed, which will be increased for said narrow four-wheel vehicles relative said four-wheel vehicles, if for no other reason, because of reduced air surface interference, and in the case of the addition of two said jet engines on the sides, and of said laterally extending and retracting wings from said roof and/or floor per Claim 19, said maximum speed of said narrow four-wheel vehicle and aircraft is increased by multiples.

The method described is manually implemented or uses Photoshop or a computer aided design program to rapidly redesign said vehicle to create said narrow vehicle, commercialized along with said vehicle, from a vehicle design and/or from drawings of a car manufacturer, or from a rendering or from a photograph of said vehicle of a car manufacturer, or by manual measurements, wherein said narrow vehicle is produced by said car manufacturer and by the same production computer aided manufacturing and assembly line method and materials as said production computer aided manufacturing and assembly line method and materials of said vehicle, said narrow vehicle comprises, a reduced by at least 25% non-adjustable width, a reduced vehicle production cost, a reduced vehicle weight, a reduced energy consumption per mile travelled to transport said reduced vehicle weight, causing a reduced quantity of $CO_2$ emissions for said production of said narrow four-wheel vehicle, and causing a reduced quantity of $CO_2$ emissions per mile travelled, relative to said vehicle.

By having the same lateral view and thus the same lateral parts the engineering, purchasing, inventory management, manufacturing and marketing efficiencies and economies of scale are maximized, reducing the production cost of said narrow vehicle, but also because the cost of these common parts is reduced by the higher volume, the production cost not only of said narrow vehicle is reduced but also the vehicle production cost of even said vehicle, from which said narrow vehicle is created, are reduced.

New designs of four-wheel narrow vehicles also have lower production cost relative to a four-wheel vehicle because of the reduced width, and the reduced number of seats, in many cases, to increase passenger utilization.

FIGS. 1A, 1B, 1C and 1D, show 4 different views of a current model (design obtained from the internet because of the availability of several (4) views with marked dimensions, called PUNTO EVO) of a 5 passenger 2 door car with the relevant dimensions in mm.

Figure 1B:
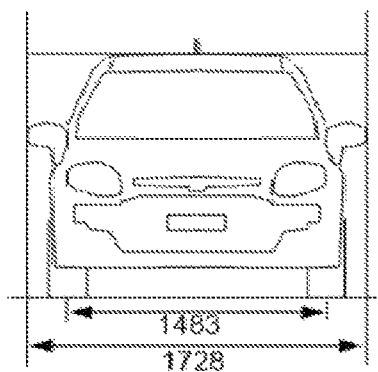

FIG. 1A is a side view i.e., a lateral view from the driver side of a current conventional 2 door vehicle. It shows the length of this car to be 4065 mm or 160 inches. (The height is 1490 mm or 58.6".) FIG. 1B is a frontal view of the current conventional 2 door vehicle. It shows the width of this car at 1728 mm or 68" (excluding exterior mirrors.)

Figure 1C:
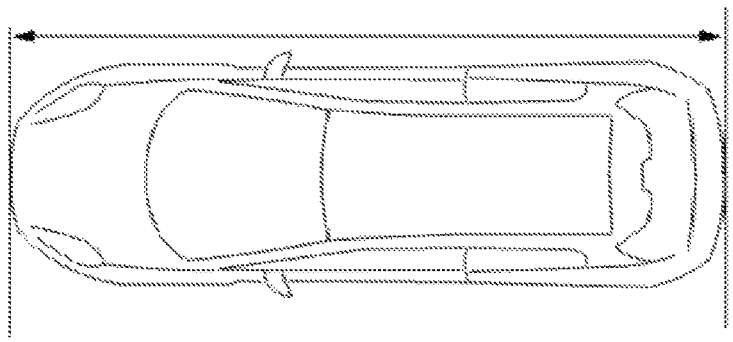

FIG. 1C is a top-down view of this conventional 2 door vehicle. The length is the same as in FIG. 1A of 4065 mm or 160".

Figure 1D:
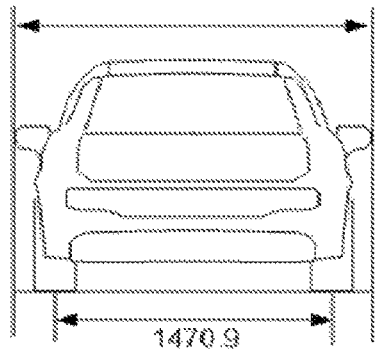

FIG. 1D is a horizontal view from the back of this vehicle. It shows the width of the wheelbase of this 2-door vehicle at 1470.9 mm or 57.9".

The Slim, Thin, narrow created vehicle above with a single front seat and a back passenger and a child, is shown in FIGS. 2A, 2B, 2C, 2D, with the relevant dimensions shown also in mm.

FIG. 2A remains the same as in FIG. 1A. The driver side, side view stays the same, in the modification for a Thin, narrow vehicle by the method above. (Assuming the wheel sizes do not change.) It also shows that the length and height of the vehicle also stay the same. Reference characters 2, show the areas from the roof and/or from the floor, from which extending and retracting, by sliding out and in, wings can be mounted on, for the cases in which said Thin, narrow vehicle is to be used to create a flying vehicle, i.e., an aircraft vehicle.

FIG. 2B is the frontal view of the created Thin, i.e., narrow vehicle without a front passenger seat, wherein its width is reduced from 1728 (excluding exterior mirrors) to 1013.6 mm i.e., to approx. 40" (excluding mirrors) a reduction by approx. 41%.

FIG. 2C shows the top-down view of the created Thin, narrow vehicle showing that the length stays the same at 4065 mm.

FIG. 2D is the horizontal view from the back of the created narrow vehicle, showing the width from the back of the car at 1013.6 mm i.e., approx. 40."

The above is one application of the method above for redesigning a conventional 4 to 5-passenger vehicle, to create a narrow vehicle, for 2 passengers plus a child or for up to 3 passengers.

THIS METHOD of relatively simply redesigning any conventional vehicle into a narrow vehicle for up to 2 and a child or up to 3 passengers or for at least three passengers, involves including the whole dashboard, internally. It also includes the driver side back seat and the back middle seat.

Externally it may be redesigned by photo-shopping it to cut it vertically to include the passenger side lights and by another vertical cut of about half that width from the center towards the driver, removing the about 35% cut, or whatever proportion is decided based on the internal part of the method, and connecting the remaining portions.

An equivalent method for establishing the non-adjustable width of a narrow vehicle is by subtracting the width of the back passenger seat behind the front passenger seat, from the width of said four-wheel vehicle.

Because the end of the dashboard (that includes all the instrumentation) usually is beyond the start of the front passenger seat, once the front passenger seat is removed there is potentially space for a glove compartment and/or small folding table, placed orthogonally to the end of the console in the empty space of the current leg room for the front passenger. The glove compartment and the width of the glove compartment of said vehicle are removed, as is the front passenger seat and front passenger door, by the creation of the narrow vehicle.

By this method of conventional vehicle redesigns to narrow vehicles, the length of the vehicle stays the same and to the extent that the wheels are not changed the height stays the same also, and only the width changes.

As mentioned above under this method the driver side, lateral view of the vehicle remains the same. However, because there is no need for a front passenger side front door, the door on the front passenger side maybe replaced by steal at the lower end, while keeping the passenger side window, or said front passenger door is set to permanently locked and/or used as emergency exit in which case the passenger side, lateral view remains the same, also, as in the current vehicles.

The above options can be for any of the current 4 or 2 doors vehicles. The up to 2 and a child and/or the three-seater enclosed, four-wheel narrow vehicles because they have only the driver seat in the front need no more than one door for all passengers to get in.

Narrow vehicles may have only one door in the front and a multitude of doors, one or two in each back row and on each added back row that is a replica of said back row.

The most likely Thin car or Slim SUV derivatives of 4 door, 4, 5 passenger Sedans or SUVs are 3 door, one in the front and two in the back. Such 3 door Sedans nor any such method of creating a narrow vehicle from redesigning a current vehicle and/or future vehicle from its drawings, have been found in our searches.

The methods disclosed can be applied to any current or future model of a four or more-wheel vehicle or vehicle design, to redesign and create a four or more-wheel vehicle with no front passenger seat, and no back seat behind said front passenger seat, and with approximately the same length and height and profile, lateral view, but with reduced width by over 25%.

As a result, the primary likely users of this narrow vehicle method are current major car manufacturers who would use it to create and produce Slim, narrow vehicle derivatives of any, some, or all their new conventional vehicle models, that would carry fewer maximum passengers but would be less expensive, be narrower, thinner, have improved performance and/or have higher mpg.

On the other hand, the primary likely users of the New Designs of Narrow vehicles comprising at least three seats, wherein only the driver seat is in the front, are probably smaller companies and potentially new entrants in the vehicle market.

NEW DESIGNS of Narrow vehicles not based on redesigning current models of conventional vehicles are also claimed for up to 2 passengers and a child and/or up to 3 passengers or for at least three passengers, with a driver seat only in the front and two seats or a bench seat for two, in each back row.

FIGS. 3A and 3B show a 2 door Thin, narrow vehicle design for up to 2 passengers (including the driver), and a child whose width, excluding the mirrors, is 1048 mm or 41.2". With the exterior mirrors the width is approx. 51.7".

FIG. 3A shows a lateral view, showing the length of the vehicle at 4638 mm or 182.6," and by the references 3, it illustrates through a line, each of the locations where a jet engine could be mounted on, or enclosed within. Reference character 4, shows the radial blades of the wheels that when switched on, rotate from parallel to said wheels to perpendicular to said wheels operating as upward lifting propellers when said wheels move forward. (The height is 1263 mm or 49.7".) In one aspect, there are two sets of wheels on each corner of which one set does not touch the ground and comprises blades that when activated act as upward lifting propellers.

In one aspect, there are blades on the Axle that when activated act as upward lifting propellers.

FIG. 3B shows this narrow vehicle's top down view, to show its interior including the back passenger seat and the child seat next to it, reference 1, and its fixed width of 1048 mm or 41.2," and by the reference characters 3, it illustrates through a line, each of the locations where a jet engine is mounted on, or where two jet engines are mounted, one on each side, which is the preferred method wherein said vehicle is a flying vehicle i.e., as a jet aircraft vehicle.

The two jet engines may also be mounted on the lateral sides of the narrow vehicle on wings. The width needed for each of the two jet engines, for some cases, is 16" in diameter each, such as the Pratt and Whitney PW615F Series, which are used to lift a light aircraft that weighs 5000 lbs.

In one aspect, four engines may be used and mounted on jet engine enclosures, on the lateral sides, above the wheels, two in the back as those shown by the reference character 3, in FIG. 3B, and two in the front of said narrow vehicle. To reduce the lateral distance needed for take-offs and landings the two front jet engine structures may, in one aspect, either rotate or be tilted downward by 5 to 25 degrees. Because conventional vehicles with two seats in the front have a minimum width of 58" because reducing that width would restrict the elbow room needed to drive and thus being not safe, neither two nor four jet engines can be mounted to lift those vehicles, as jet engine aircraft vehicles, given the maximum width limitation of vehicles on the road. The engine of said narrow four-wheel vehicle is either gas or hybrid or electric or diesel or hydrogen engine and in the case of aircraft vehicles in addition to said engine said narrow vehicle further comprises two jet engines on said lateral sides of said narrow four wheel vehicle, wherein said non-adjustable width of said narrow four-wheel vehicle is increased relative to said non-adjustable width of said four-wheel vehicle, because of the wings and the two jet engines on the sides, so said vehicle size of said aircraft vehicle, with a narrow body frame, is increased relative to said vehicle size of said four-wheel vehicle.

For driverless vehicles without a steering wheel, the non-adjustable width of said narrow four-wheel vehicle is reduced to less than 58" with up to two front seats and up to two seats in each said or added back row. Narrow four or more-wheel vehicles may be like trains, carrying as a whole body structure or as trailers or as passenger compartments attached modules one or more narrow vehicle passenger compartments on wheels, without an engine and its engine hood and without a trunk, with up to two seats or a bench seat for two seats per row, with each row further comprising either battery packs or fuel cell tracks under the floor.

(j. B) Applications of the Above Method to Create Narrow Vehicles

For example, applying the method above:

A two seat Slim, narrow car derivative created from a four passenger Volkswagen Beetle that is (58.0" to 58.7" in height, 168.7" in length) and 71.2" wide is at a minimum approx. 39" wide but that would be for 2 passengers only because the back middle (central) seat is too small for even a child.

To extend that middle back seat and make it for up to 2 passengers and a child Slim VW Beetle, the minimum width would need to be approx. 46" and that is a 35.4% reduction in width, and approx. weight and increase in mpg.

The up to 2 passengers and a child, Slim, narrow vehicle created from the 5 passenger Ford Fusion that is (58.1" in height, 191.7" in length) and 72.9" wide (without the exterior mirrors) is at minimum 48" wide (w/o mirrors) and has the same length and height as above; that is a 34% reduction in width and approx. weight, car volume, production costs, gas consumption and emissions.

The five seat Slim, narrow vehicle created from a 7 passenger (3 Rows) SUV Ford Expedition that is (77.2" in height, 206.5" in length and) 78.8" wide is at minimum 56" wide; that is a 29% reduction in width, approx. weight, energy consumption, and emissions.

All the widths of vehicles described, are without the exterior mirrors and are referred to as non-adjustable width. When the width of the exterior mirrors is added, or when the width of the two jet engines on the sides and/or the adjustable, in terms of extension, width of the wings is added, in the case of aircraft vehicles, the total width is referred to as vehicle width.

Because the width of the vehicle for the same model usually stays the same from year to year the above widths for the Slim, narrow vehicles created from those conventional vehicles stay usually the same for past years models and probably for future models.

A Utility claim is for a method of creating narrow single front seat derivatives of any vehicle, including of 3 Row SUVs, resulting in 1, 2, 2 and a child, 3-seater or 5 seat vehicles, and by the addition of back rows, creating narrow vehicles comprising at least one seat and up to 11 seats.

The widths given are the minimums because to accommodate any other design considerations including for safety or for increasing the width of the back middle seat, the widths of Narrow vehicles may be increased up to 58" and still be narrower than most, in fact all, according to our searches, current 4-wheel, dimensionally non-adjustable, highway vehicles.

Assuming no improvement in engines as to gas mileage, the gas mileage and even the gas mileage per passenger mile is reduced by Narrow vehicles by over 25%, for the most frequent travel of, no more than 2 passengers and a child, or three passengers.

The driver side lateral view of the vehicles or SUVs stays the same. The front passenger side lateral view because there is no need for front side door may be replaced by steel and windows or set to permanently closed (emergency only exit) in which case both lateral side views stay the same.

THIS METHOD for derivatives of current and future car, passenger truck and SUV models, externally: New Designs, Drawings and pictures of narrow vehicles can be created from any current 4-wheel conventional vehicle, by photoshopping it to cut it vertically to include the external lights of the front passenger side and another vertical cut of about half that width from the center towards the driver side, and then removing the about 35%. The width that is to be reduced, based on the decided internal structure of seats, is removed by a half from the left side and another half from the right side of the vehicle, from in between the longitudinal axis and the inner edges of the external lights.

This is a method for redesigning a four-wheel vehicle having a lateral view, lateral parts, a longitudinal axis, having lights with inner edges of said lights, a driver seat, a back seat behind said driver seat, a back middle seat, a front passenger seat having a front passenger seat width, a back seat behind said front passenger seat, having a back seat behind said front passenger seat width, to create a narrow vehicle, having the same lateral view and the same lateral parts relative to said four-wheel vehicle, and having a reduced non-adjustable width by at least 25% relative to said four-wheel vehicle, said method comprising the steps of:

A) establishing said non-adjustable width of said narrow vehicle by subtracting said back seat behind said front passenger seat width, from said four-wheel vehicle width, B) reducing, as an exterior design step, half of said back seat behind said front passenger seat width, from the right side and half of said back seat behind said front passenger seat width from the left side of said four-wheel vehicle, from in between said longitudinal axis and said inner edges of said lights.

Because one primary application of Narrow vehicles is for work commute, to increase safety, quite smaller than 35% smaller and maybe up to 75% smaller engines, in cubic feet, can and probably should be used, even if by limiting maximum vehicle speed to 80 miles/hour. If added engine power is needed battery packs may be added in the back of the vehicle or under the floor of each seating row thus creating a hybrid narrow vehicle. If space availability needs to increase for the engine or storage or to increase interior space per passenger or to add seats by adding back rows, the length of the vehicle may be increased, because the road limitations as to vehicle length are much greater than they are relative to the vehicle width.

Redesigns that move the batteries in the back or under the floor of the vehicle to increase engine room and lower the center of gravity and redesigns that make the narrow vehicles having four-wheel drives (if they are not already so) to avoid moving the axle and increase car stability will be useful and maybe necessary.

The following is a quote from a passenger safety site: "The back seat is the safest place for your children—safer for everyone regardless of age, height, or weight—because most crashes occur in the front of the car and the back seat is farthest from this impact. So, in general there is a lower risk of injury for back seat passengers."

Given that in the US children are not allowed in the front passenger seat and to the extent that even adults are better off in back seats rather than on the front passenger seat, relative to Smart cars and other vehicles, narrow vehicles are safer for their passengers.

Claims drawn to a vehicle, of four-wheel narrow vehicles, with no front passenger seat, (and no back passenger seat behind said front passenger seat) having a non-adjustable width of in between 40"-58", Thin cars™ Thincars.com", Tc's™, Slim cars™, Slimcars™, Cars light™, Personalcars.com™, (that are not based on about-half width sizing, more accurately about 65% of the width, any current vehicle,) for up to 2 passengers and a child or for up to 3 passengers or comprising at least three seats are claimed.

Reduced energy consumption per passenger mile, and reduced $CO_2$ emissions per passenger mile are valid so long as average vehicle utilization, of 1.55 persons per mile in the US, and trending down, is not above 3, and even in those cases narrow vehicles with added back rows, to have the same number of seats as said four-wheel vehicle, have distinctly improved performance by all the above performance measurement criteria and reduce traffic congestions, relative to said four-wheel vehicles.

The criticality for the necessity of this limitation of reduced energy consumption per mile, is the reduction of energy demand and thus of energy costs and the reduction of $CO_2$ emissions per mile, of said narrow four-wheel vehicles relative to said four-wheel vehicles.

The dimensions, and the number of seats, and even the seating arrangement of a vehicle seem to be patentable matter because aspects of these have been patented as is the case with the previously referenced patents by Tsukerman, (U.S. Pat. No. 8,944,456) for a "dimensionally adjustable vehicle", whose weight is not reduced when in retracted position so that its energy consumption is not reduced but rather is increased, by Frohnmayer, (U.S. Pat. No. 8,985,255) for a two-seater three-wheel vehicle, and by Woodhouse, (U.S. Pat. No. 8,950,796) which is for a "seating arrangement for a passenger vehicle."

Other referenced or pertinent to the disclosure patents, from a prior application Ser. No. 15/807,236 by the applicant of this invention, for which an election was required and made for claims drawn to a method of creating narrow vehicles by redesigning four-wheel vehicles and for which the claims drawn to a vehicle were withdrawn, are by: Bartilson (U.S. Pat. No. 8,556,009), Ahn (U.S. Pat. No. 9,199,672), Thomas (U.S. Publication 2015/0137557), Suzuki (U.S Publication 2015/0203162), Tsukerman (U.S. Patent 2015/8944456); and Wang (U.S. Publication 2007/0038422).

A criticality for the necessity of narrow vehicles, of the limitation "reduced non-adjustable width by at least 25%," of the limitation "a width that is less than fifty-eight inches" is the critical limitation of roads and highways in terms of width causing traffic congestions and parking availability problems. 58" is chosen because it is narrower than the narrowest four-wheel highway vehicle. At a width that is less than 58" there isn't enough elbow room for the driver if there is also a front passenger; however, 58" is enough width for two seats or a bench seat for two, in the back rows, or in the front if there is no driver, i.e., if the vehicle is driverless.

The criticalities for the necessity of narrow vehicles as an integral part of creating aircraft vehicles or jet aircraft vehicles are the critical limitations of both road width, and of maximum allowed by law vehicle width, making it not feasible to add two or more jet engines on the lateral sides and not feasible to add wings with enough wing width to lift said (conventional) four-wheel highway vehicle. A narrow vehicle i.e., with no front side-passenger seat, constructed with light material, a jet turbine mounted from the roof and/or in the back, similarly but a smaller version of the tail turbine of a DC-10, or preferably with two jet engines one on each of the lateral sides, along with wings extending and retracting from the roof and/or the floor of said narrow vehicle, which may drive and take off, fly as Personal planes/cars, i.e., as aircraft vehicles, in pre-defined limited range of altitudes above the current road system, and land on 12 foot car lanes, is claimed.

The Thin, narrow vehicle's aero dynamic flow is better than that of current conventional vehicles, because the reduction of the surface displaced by the vehicle motion is proportional to the reduction in the width of the vehicle. As a result, narrow vehicles even with the same and even larger seating capacity are more energy efficient relative to conventional vehicles.

Narrow highway vehicles created by redesigns of four-wheel highway vehicles can also be with just one or just two seats and be distinct, because they comprise the same lateral view, and therefore the same lateral parts, as said four-wheel vehicle, and therefore be cost effective by maximizing engineering, purchasing, inventory control, manufacturing, and marketing economies of scale.

Four-wheel highway narrow vehicles either independently designed or by the methods described of redesigning a vehicle, are all described methods, modifications of the methods, alternative methods, and equivalent methods of creating a narrow four or more wheel vehicle, and a narrow body jet aircraft vehicle, which perform distinctly a clearly better relative to current vehicles, and to the referred Publication, terms of their vehicular capacity, improving traffic throughput and reducing traffic congestions and in terms of acceleration, deceleration and maximum speed, while providing an option for four wheel vehicles with only 3 seats, which is currently not available, and an option for vehicles comprising up to 7 rows with a searing capacity of up to 13 people including the driver, or with fewer seats and larger cargo capacity.

A narrow vehicle is a critical step, and integral to this invention, for creating jet aircraft vehicles i.e., vehicles that are also aircraft, also referred to as flying vehicles, because the conventional vehicles with two front passenger seats are too wide and too heavy to be able to fly, land and drive in the standard 12' foot lanes. For conventional vehicles there is no width room for wings nor for two or four jet engine support structures on the lateral sides, so that a Thin, narrow highway vehicle is an integral and necessary part, and is not an independent invention, for creating flying narrow body highway vehicles that can take off, land and drive in the standard 12-foot highway lanes.

Thin, narrow vehicles of a width of less than 58," with no front side-passenger seats, constructed with light material, comprising a jet engine mounted from the roof and/or under the floor, and/or in the back similarly but a smaller version of the tail jet engine of a DC-10, (as shown in FIG. 3A, reference 3) or preferably two jet engines on the lateral sides of the vehicle mounted on jet engine support structures, as shown by reference character 3 on FIG. 3B, further comprising wings on each side extending and retracting from the roof and/or the floor of the narrow vehicle so that the narrow vehicle may drive and take off, fly as Personal plane/aircraft/vehicle in pre-defined limited range of altitudes, land on a 12 foot highway lane, and drive as a highway vehicle, is one of the critical elements of why four or more-wheel narrow vehicles are not "obvious" and would not have been obvious to any prior invention and cannot be met by the current state of the art.

Flying narrow vehicles i.e., aircraft vehicles may fly, on stacked, two to five thousand feet apart, in terms of altitude, air highways that are above, by 1,000 feet to 20,000 feet, and with much wider lanes, the current highways or above the current road system.

The lateral distance between the wheels of a narrow vehicle may remain the same as that of a four-wheel vehicle, i.e., keeping the same chassis, while the width of the passenger compartment is reduced, in the case of aircraft vehicles.

Instead of reducing the size of the wheels as per the reduction in vehicle width the wheels and brakes may stay the same to improve vehicle performance in terms of stability and vehicle deceleration.

The wheels of said four-wheel thin vehicle, are either the same as said wheels of said four-wheel vehicle or are replaced with different size and/or different type wheels, wherein if said four-wheel thin, narrow vehicle is to be used as a flying vehicle, while the width of the passenger compartment is reduced, the lateral distance between said wheels stays the same as the width of said four-wheel vehicle, said wheels further comprising of parallel to said wheels blades, as radials, as illustrated in FIG. 3A, reference 4, that when switched on rotate from parallel to perpendicular to said wheels and operate as upward lifting propellers when said wheels rotate forward.

In one aspect said wheels have a cover on the radial section of the wheels to inhibit air going through them and operating as rotors in the case of jet aircraft vehicles.

Said four-wheel highway thin, light, aircraft vehicle further comprising a roof, a floor and wings, wherein said wings slide out laterally and retract, wherein said wings further comprise smaller laterally sliding-out and sliding-in wings, from over said roof, and/or from under said floor, and/or the hood and/or the trunk said wings being also capable of rotating, or said wings further comprising of slats and/or flaps that rotate, downward and upward, up to 90. In one aspect said wings or winglets operate as rotors and stabilizers.

In one aspect, a jet engine is mounted on said roof and in some cases also supported from the back, of said four-wheel highway_thin vehicle, or said jet engine is mounted on the trunk of said four-wheel highway thin vehicle, wherein said trunk being controlled by the driver "opens" downward, up to 30, or said jet engine is mounted on a "tail" or is mounted underneath said four-wheel highway thin vehicle, as shown in FIG. 3A, reference 3.

In one aspect, which is the preferred embodiment, said aircraft vehicle further comprises fixed width extensions for jet engine support structures that are above the wheels and laterally extended out from the wheels, or wings, wherein two or more jet engines are mounted within or on said narrow vehicle extensions for jet engine support/enclosure structures or extendable and retracting wings, one or two on the right side and one or two symmetrically on the left side, and extend laterally away from said car body and backward to the length of said jet engines. Two jet engine enclosure structures are shown in FIG. 3B, reference 3.

The vehicle width of said aircraft vehicle is adjustable by the driver, by adjusting the extension of the wings, wherein said number of seats is one or more, wherein said aircraft vehicle can takeoff, fly, land, and continue driving within a single 12-foot highway lane, or within two highway lanes.

In one aspect, the height of the passenger compartment of said narrow vehicle may be redesigned, by any method, including by adding windows and panels above the current windows and panels, at approximately the same angle or at an appropriate angle to create a tall vehicle, allowing for standing room in at least part of the passenger compartment. In one aspect, said narrow vehicle further comprises a plurality of seating rows, redesigned, by any method, including by replicating said narrow vehicle's back seating row and inserting it as an added back seating row behind said back seating row, to create a three or more row long, and/or a narrow tall, long vehicle, or to create a tall, long aircraft vehicle. As a result, said narrow vehicle comprises a multitude of doors or just one door.

(j. C) Description of Preferred Embodiment

Even though the improved performance, the reduction of by over 25% of $CO_2$ emissions per mile, reduction of vehicle costs and increased traffic throughput i.e., the number of vehicles that can traverse a road system at a time, are valid for all narrow vehicles with any engine, the preferred embodiment is by hybrid engines or electric engines—with the battery pack in the back and under each seating row, and the engine or electric motor in the front—which further reduce $CO_2$ emissions. Because of the reduced by about 35% size-weight and weight carried, the range of hybrid or electric Thin, Slim, narrow, single front seat vehicles without refueling or recharging can also increase by at least 25%.

In one aspect, the battery packs are placed vertically behind the seats of each back seating row, and the length of each back seating row is increased.

The utility, value of the advantages of the claims above are higher internationally because of large potential car buyers that currently cannot afford a new car, growth is higher, road infrastructure is mostly narrower, $CO_2$ emissions are already too high, and because Thincars, narrow vehicles by having only one front seat are inherently suited for both left and right driving nations.

Because of their much smaller width than current vehicles, Thin, narrow vehicles are, by definition, particularly suited for narrower roads.

A particular iteration of Thincars, Slimcars, Personal cars, Narrow vehicles™ have solar panels, embedded, or attached on the roof, and/or the hood and/or the trunk, and/or comprise a small wind turbine.

In another aspect, Narrow vehicles will have internet and electrical plugs both within the narrow vehicle and as outlets from the vehicle, in some cases on the no longer needed front passenger door, on the interior and/or exterior of that permanently (except for emergency) locked door panel, so that their electric energy produced and internet access, can be used by other appliances, within and outside the vehicle, if desired. These iterations that have with-in and on the exterior to the vehicle electric and communications plugs are not just for energy and communications inputs but for their outputs also, are particularly applicable for electric and hybrid vehicles because they have significant battery storage that is rechargeable.

An iteration will provide an internal button that automatically folds and unfolds the exterior mirror casings, for cases where further reducing the vehicle width is critical.

A dependent claimed iteration that is applicable to both a narrow vehicle and a four-wheel vehicle and particularly to a driverless vehicle of the "no front passenger seat and no corresponding back passenger seat" narrow vehicle design, wherein said vehicle having a front seat and a seat behind said front seat, wherein said front seat, said back seat behind said front seat and said back middle seat, are replaced by material transportation structures, such as but not limited to documents, food, packages, luggage, and/or equipment and/or are replaced by a single seat, wherein said single seat moves forward, backward, and reclines to a horizontal position as a lie-flat seat, or as a bed, said single seat further comprising a folding and unfolding footrest.

Some iterations of Thin, Slim/Smarter, narrow vehicles will be controlled, diagnosed and their console information displayed by a standard "personal" cell phone and/or screen/tablet. They may have an input tablet/phone or have a single tablet on the front dashboard for both input, control, diagnosing and display so to the extent that these claims have not been patented already for Thincars, narrow vehicles they are claimed.

Said narrow vehicle further comprises internal to the vehicle and on the exterior of the vehicle electronic and electrical inlets and/or outlets, wherein said narrow vehicle is controlled and driven by instructions to an external or internal plug-in and plug-out controller or cellular phone or tablet, through a vehicle software application.

In one aspect, narrow four or more-wheel vehicles, and jet aircraft vehicles, are controlled by a mobile phone, or a tablet, or a video game control console, that are removable and/or insertable, through a vehicle software application program. Because of the method described above, the interior space per passenger of narrow vehicles is equal or more than that of the conventional vehicle from which they are created. Specifically, the space for the back seat behind the driver is the same for Narrow vehicles as with the original conventional vehicle from which it is created; the interior space for the driver is increased because Narrow vehicles use all the shared space with the front passenger seat, and the middle back seat has slightly more space because of leg room availability from some of the space occupied by the front passenger seat.

Because of the above, the relative improvement of over 25% in costs may seem insufficient relative to the reduction of the maximum number of passengers from 4 or 5 to 2 and a child or 3 but to those who don't, don't want or intend to be carrying more than 2 other passengers at a time because they need the vehicle primarily for work commute, that average 1.13 passengers per vehicle mile, it is likely to be a desirable trade-off, and it is currently not available.

A minor benefit, which is why it is not listed on the separate page of the advantages section but is worth noting of Slim, Narrow vehicles is that because of their reduced width, size, weight, and engine size they are likely to be making less noise for the same amount of human transportation (given the current usage statistics) and thus also reducing vehicle noise pollution.

Because of the reduced by over 25% width, size and correspondingly weight of Thincars" manufacturing them should be easier than the current double-sized heavier assembly lines, so manufacturing costs, if the utility application is approved, by TBD Plant claims, and eventually all other user costs and emissions maybe reduced by more than 50%, because economies of scale are generally larger when sizes of products for the same or similar function decrease and eventually quantities increase, as evidenced by the computer industry.

All the searches showed of no other patent or vehicles for:

A method by which to design (and produce) narrow vehicles, capable of highway commute, with gas and/or hybrid and/or electric engines, from past, current and future vehicle models, that are by over 25% less wide, Thin, Slim, Light versions of current vehicles by having only one front seat and as a result are thinner, ranging in width from 40"-58" (without the exterior mirrors,) is claimed.

Narrow vehicles are more aerodynamic by displacing less surface air by their motions, and thus reducing the energy needed and consumed to displace said reduced surface air. Narrow vehicles also weight less, because of the reduced width and reduced lateral rigidity needs, allowing for easier manufacturing of the top-down parts, as the hood, trunk, and roof with lighter than steel materials, thus also lowering the center of gravity of the narrow vehicles. As a result of their reduced weight and reduced aerodynamic air resistance narrow vehicles consume less gasoline and/or electricity, reduce pollution and increase the range, by at least 25% relative to current conventional or electric vehicles. See FIG. 1 and FIG. 2.

New designs of Narrow vehicles with a single front seat, and two passengers in each back row, comprising at least three seats, that are narrower than current vehicles, having a non-adjustable width that is in between 40" and 58" (without the exterior mirrors) are claimed.

Narrow at least three seat vehicles that are less than 58", or narrower than said four-wheel highway vehicle, are more aerodynamic, look more appealing, perform distinctly better, cost less, consume less gasoline and/or electricity and reduce $CO_2$ car emissions relative to the current 4 to 5-seater vehicles. See FIG. 2 and FIG. 3.

Because the passengers of narrow vehicles are all in the back, narrow vehicles are safer for the "would be front passenger" than conventional vehicles that have a front passenger seat, that in the trade is also referred to as "death seat." Narrow vehicles are safer also because of increased maneuverability and because of increased vehicle deceleration. According to the usage statistics Thin, narrow vehicles having three seats would be fully adequate for an exceptionally large segment of car owners.

The integrity of the invention of narrow body vehicles is critical whether created by the methods shown from designs of current two front seats vehicles or created independently and whether used for land transportation of by air transportation by jet aircraft vehicles. Because if an election is required which would make the elected method result in smaller vehicles or in larger vehicles relative to conventional vehicles and then argue that the elected method results in smaller or larger versions of current vehicles, would violate the integrity of the invention because narrow vehicles are smaller in some cases as needed and larger than conventional vehicles in other cases, as needed.

U.S Publication 20070038422, by Wang, is clearly distinct from this invention and it would not be obvious at all to a person of ordinary skill in the art to create narrow vehicles as described in this invention because:

A) Narrow vehicles are created manually or by a Computer Aided Design, CAD or Computer Aided Engineering program, CAE, modeled and constructed by Print on Demand Manufacturing, and manufactured through a CAM program, specifically excluding a computer implemented method and system for designing a vehicle package.

B) Said publication option for added seat, per paragraph [0048], that is referenced, is for "optional front seats" specifically, and there is no indication, and it was not obvious, and it is not obvious to add a seat in the back without adding any seats in the front, which however is critically necessary for being able to transport multiple passengers and remaining narrow, i.e., less than 58" wide. For example, for the vehicle package shown by Wang, to carry 11 passengers would take, if as shown, 11 rows, i.e., 9 more back seat rows which is not practical, and would not be stable in most curves.

Paragraph [0066] refers to "the design changes may be a change in a dimension" which any design program can do and is unspecific and could be any dimension in any direction, with no mention nor any indication nor would it be obvious to reduce the width of the vehicle, by having only one front seat and two seats in each back row. The dimensions are not shown in Wang, so it is unclear whether the width of the vehicles shown are in between 40" and 58", Most probably the vehicle package shown in FIG. 8 is less than 40" wide, as it does not comprise two seats in each back row. It would not be obvious at all to set the limitations of vehicle width as above, under Wang.

C) There is no mention, no indication, and it is not obvious to replace a front and the corresponding back seat with a lie flat seat/bed.

D) Each module of a back row comprises a battery pack or hydrogen fuel cell module under the floor, to provide added power. Said battery pack or fuel cell power module under the floor also lowers the center of gravity for improved stability. There is no mention, no indication, and it would not be obvious to do so under Wang.

E) Because of the reduced width the rigidity requirements of the largest sheet metal components of the hood and of the trunk, which also need to be getting lifted manually, and of the roof, are constructed by lighter than steel materials, thus further reducing the weight of the narrow vehicle and lowering the center of gravity. No such provision is shown or indicated by the above referenced publication, and it would not be obvious at all to do so under Wang.

F) When said narrow vehicles are created from redesigns of conventional four-wheel vehicles, they allow for both the conventional vehicle and the narrow vehicle to be designed, manufactured, and marketed at the same time addressing different market segments. The same lateral view and thus the same lateral parts are critical to by increased volume reduce the vehicle costs of both vehicles and it is also critical for co-marketing said narrow vehicles. There is no mention, no indication and it would not be obvious under Wang to co-market two vehicles with the same lateral view and the same lateral parts to different market segments. There is no indication, and it would not be obvious, and it is not obvious to do so under Wang.

G) There is no indication nor was it or is it obvious to create narrow vehicles designed either independently or by said method, that are jet aircraft vehicles.

H) The performance of narrow vehicles, whether smaller in size or larger by adding back row modules or for increasing the size of the engine or for increased room for each row or for increased storage, because of the above reasons A to G is significantly better than conventional four or more-wheel vehicles with the same number of seats in terms of their increased vehicular capacity, reducing traffic congestions, and in terms of improved acceleration, improved deceleration and increased maximum speed because of improved aerodynamics and as a result have also improved energy efficiency relative to said four-wheel vehicles.

A jet aircraft vehicle, with a narrow vehicle body and a narrow passenger compartment, further comprising two jet engines, one on each lateral side, comprising extending and retracting wings from the roof and/or floor and/or the hood and/or the trunk is claimed. In one aspect 4 smaller jet engines are added two on each side, one on the front and one in the back.

The narrow vehicle has a non-adjustable width of said passenger compartment is less than 58", wherein a chassis of the vehicle is wider than 58", wherein said narrow vehicle further comprises front wheels and back wheels rotatably connected to said narrow vehicle, wherein said narrow vehicle is a jet aircraft vehicle said wheels are replaced with different size and/or different type wheels, said wheels further comprising wide propeller blades, as radials, or as attachments to the axle that are perpendicular to said wheels, said wide propeller blades rotating from parallel to perpendicular to said wheels and operating as upward lifting propellers when said wheels spin forward.

The narrow body jet aircraft vehicle is dimensionally adjustable, constructed primarily with materials lighter than steel, wherein said narrow body jet aircraft vehicle is used to fly, to takeoff, to land and to drive within 12-foot wide highway lanes, wherein said narrow body jet aircraft vehicle further comprises extending and retracting wings, wherein said wings further comprise extending and retracting smaller wings, stabilizers, flaps, slats, rotating up to 90 degrees and, wherein said vehicle width of said jet aircraft vehicle is adjusted by laterally extending and/or retracting said wings from said roof and/or from said floor and/or said hood and/or said trunk of said narrow jet aircraft vehicle, wherein said jet aircraft vehicle further comprises two or four jet engines on said lateral sides of said jet aircraft vehicle, above said wheels.

The narrow vehicle, has a vehicle weight and has a vehicle performance measured by vehicle acceleration, maximum speed, and vehicle deceleration, and has a vehicle maneuverability and safety, and has a vehicle energy consumption per mile causing a quantity of carbon dioxide, $CO_2$ emissions, and wherein said narrow vehicle comprises a reduced said non-adjustable width, a reduced said vehicle weight, a reduced said energy consumption per mile causing, a reduced said quantity of $CO_2$, emissions per mile, an increased traffic throughput, or vehicular capacity i.e. the number of vehicles that can traverse a road system at a time, an increased vehicle maneuverability and increased passenger safety, and an improved vehicle performance relative to said four-wheel highway vehicle.

In one aspect, said narrow vehicle has an interior and an exterior, and further comprises electronic and electrical inlets and/or outlets on said interior and/or on said exterior of said narrow vehicle, wherein said narrow vehicle is controlled and driven or driver assisted by instructions to an external or interior cellular telephone or a computer tablet or a video game console or an Unmanned Aerial Vehicle, UAV, control console, through a vehicle software and/or plug-in, plug-out hardware application.

To assure enough wingspan for jet aircraft vehicles the wings either rotate out and in, or the preferred method is that there are two wings, on the roof and/or under the floor, and/or the (engine) hood, and/or the trunk each the size of the roof and/or the floor and or the trunk and/or the hood, respectively, that slide out, and slide-in, one to the left and one to the right, that further comprise smaller wings or winglets, that also rotate up and down, up to 80%, as flaps and slates. With the wings laterally extended, in one aspect, with up to 8 (two on the roof, two on the floor, two on the hood and two on the trunk) such laterally extending and retracting wings, winglets, rotors, stabilizers, slates and flaps, the width of the narrow body jet aircraft vehicle is up to 11.0 feet or the maximum allowed for 12-foot lanes, which is more than adequate wing-span availability for achieving flight. To assure shorter take-off and landing distances and increased stability, in another aspect, the jet aircraft narrow body vehicle maximum width, with the wings fully extended, is 22 feet or maximum allowed, with up to 8 wings, winglets, rotors, flaps, slates, for take-off and landings on two highway lanes.

The expected most common preferred embodiment of jet aircraft vehicles, with a narrow body of less than 58", are constructed with materials lighter than steel, are driver assisted or driverless, with a small hybrid diesel engine, with a diesel fuel tank on the side that supplies both the jet engines and the vehicle engine, comprising 1 or 3 or 5 or 7 or 9 or 11 seats, one in the front, and back seating rows each comprising a bench with two seats, with a battery pack under the floor of the last seating row for city driving, two jet engines on the lateral sides on the back above the wheels as shown in FIG. 3B, extending and retracting wings comprising smaller extending and retracting wings from part of the roof and from the floor, cameras and sensors on the roof and on the sides and front and back bummers, flaps and slates on wings extending and retracting from the hood, stabilizer wings and rotors on the trunk and a solar panel on the trunk, wheels of which the radials are covered to not allow air to get through and act as rotors when in flight, with stronger and at times longer suspensions, and upward lifting propeller blades that rotate from parallel to perpendicular to the wheels connected to the hybrid engine that attach to the axles when activated for reducing the takeoff and landing distances.

For high altitude super-sonic or space travel, the passenger compartment comprises a pressure-controlled passenger compartment, heat insulated materials that cover the outer layer of the narrow vehicle, the front and hood are conical, have a back-up parachute released from the roof, and instead of two jet engines, comprise two rocket engines attached on enclosures to the back sides, or a single rocket attached to the back of the vehicle.

The allowance of these narrow vehicle claims will offer the opportunity to the public to fully meet their specific seat requirement needs, some of which are currently not available, such as 3 seats, while reducing traffic congestions and parking unavailability with improved vehicle performance, reducing vehicle costs, reducing energy consumption, and the resulting from reduced energy consumption reduced $CO_2$ emissions from the vehicles or from the electrical energy production sources by over 25%.

(j. D) THE CRITICAL ADVANTAGES and necessities of both the narrow vehicles by the method above of current and future vehicle designs; and of single front seat new designs of narrow vehicles having a non-adjustable width that is in between 40" to 58" are:
1) Reduction in traffic congestions thus increased traffic throughput also referred to as vehicle veracity i.e., the number of vehicles that can traverse a road system at a time, because of the reduced width of Narrow, Thin, Slim, Light, Smarter vehicles, relative to current vehicles and because road limitations are critical in terms of width not length.
2) The hood and/or trunk and/or roof of narrow vehicles is constructed either by materials lighter than steel or further comprise solar panels. Narrow vehicles because they are narrower, more aerodynamic, and lighter they have improved vehicle performance in terms of vehicle acceleration, vehicle deceleration, maximum speed, and improved vehicular capacity, when comprising the same engine size and the same number of seats and have the same or even larger size relative to said four-wheel vehicle. The Narrow vehicles passenger compartment is designed and built as modules of a driver seat only in the front and two seats in each back row, and with each row comprising battery packs or hydrogen fuel cell tracks under the floor, and with the last back row having back wheels, motors, inverter, electronics controller and fuel tanks or charging plugs, therefore have greater flexibility and availability for the desirable number of seats such as 1, particularly 3 seats that currently do not exist and are not shown or indicated by any of the above referenced patents, as well as 5,7, and also the currently not available 9 and/or 11 seats.

3) Because narrow vehicles are narrow the reduction of gasoline and/or electricity consumption and costs, and given the usage statistics, there is a reduction of gas/electricity consumption per passenger mile, through increased gas and/or electricity mileage by over 25% of the Narrow vehicles relatively to current vehicles. (Assuming the same performance of engines.)

4) Reduction of $CO_2$, and of other pollutants including CO, emitted by Narrow vehicles or by the source of electrical energy production is by over 25% relative to current vehicles with the equivalent engine performance. This advantage on its own can be the most significant contributor for the USA (and for any country) by adopting Narrow vehicles to reduce energy consumption and thus reduce energy costs and to meet or exceed the Paris Accord Climate Change targets, that were "In the range of 17% below 2005 levels by 2020" (www.c2es.org/international/history-international-negotiations/2020-targets) even if the US is not a signatory of the Accord. "Energy-related $CO_2$ emissions in 2016 were 823 MMmt (14%) below 2005 levels." www.google.com/search?rlz=1C2CHFX_enUS445US455&source=hp&q=US+C02+EMISSIONS+IN+2016+relative+to+2005&oq=US+CO2+EMISSIONS+1N+2016+relative+to+2005&gs_l=psy-ab.12 . . . 617.46017.0.49954.45.44.1.0.0.0.557.5649.23j15j2j1j1j1.43.0 . . . 0 . . . 1.1.64.psy-ab . . . 1.39.5189 . . . 0j46j0i131k1j0i46k1j0i22i30k1j33i22i29i30k 1j33i21k1j33i16 0k1.0.lymyV5fxlUY.

The New narrow vehicles, with a single front seat, are personal vehicles, as compared to current vehicles with two front seats that are designed as family vehicles, because are narrower and lighter are also better candidates to be hybrid and/or electric vehicles and in the case of the methods described are converted into hybrid, electric or fuel cell vehicles thus reducing $CO_2$ emissions and increasing mpg even more than the over 25%. Considering the emission reductions from producing, including the reduction in the production of steel for vehicles, narrow vehicles on their own, if these claims are allowed, may reduce $CO_2$ emissions in the US by as much as the target of 50% by 2030; and they may reduce $CO_2$ emissions by about 50% globally by 2030.

Narrow vehicles are also better candidates for driverless vehicles because driverless vehicles need not a driver and thus need a fewer number of total seats, to meet the transportation seating needs of the public.

5) Reduction of production costs and increased price accessibility of the new Thin, Narrow vehicles for people of fewer financial means because of the lower price of Narrow vehicles relative to current vehicles. This will contribute to significant economic growth, domestically and globally.

6) Likely reduction of injuries to passengers by the non-availability of a front passenger seat, given that the front passenger is the most likely to be most injured. Increased safety of narrow vehicles relative to current passenger vehicles is also because of their increased maneuverability on roads, which are critically limited by width and because of improved vehicle deceleration, when using the same wheels and brakes as said vehicle.

7) Narrow vehicles or the passenger compartment of said narrow vehicles, because they are narrower, more aerodynamic, and lighter, allow width room, within the 102" maximum vehicle width limit by Federal law, for two or more jet engines on the lateral sides of said narrow vehicles and for sliding-out and sliding-in wings, from the roof and/or floor and/or hood and/or trunk, that are also critically necessary to create jet aircraft vehicles, i.e., cars/planes, that can take off, fly and land on a single 12" highway lane, or on two highway lanes.

8) Increase in availability of parking spaces because of the reduced by over 25% width of Thin, Narrow vehicles relative to current vehicles that allows more vehicles to be parked in the currently available parking areas. Particularly for parking on roads within inner cities narrow vehicles allow for more road width for traffic to go through, thus further reducing traffic congestions in inner cities.

The referenced studies and statistics show that the seating needs, vehicle occupancy, traffic congestions, the need for much better energy efficiency of vehicles, the most impacted by injury front seat, and the technology improvements that make co-piloting unnecessary, have significantly changed since the early $20^{th}$ century, yet the vehicle structures have not changed to meet the current transportation needs efficiently.

Narrow vehicles beyond meeting a wider range people's transportation seating needs more efficiently in terms of occupancy, with significantly improved vehicle performance by said vehicle performance criteria, and with increased safety and reduced vehicle costs and operating costs and being critically necessary for the creation of jet aircraft vehicles, the criticality and the urgency for the necessity of creating narrow four or more-wheel vehicles is the continuing damage caused to people's lives and livelihoods by the unnecessary road width utilization inefficiency, causing traffic congestions, unnecessary resulting time inefficiency, unnecessarily low passengers per vehicle mile inefficiency, and unnecessary aerodynamic inefficiency, that result in large unnecessary energy consumption, therefore unnecessary increased energy costs, and unnecessary $CO_2$ emissions by the vehicles or at the energy production source contributing to unnecessary global warming and its effects.

It is to be understood that the methods and/or structures described is considered illustrative only of the principles of the invention. Many modifications can be made by those familiar in the art, of the methods and/or structures without departing from the concepts of the present invention, and further it is to be understood that such modifications are intended to be covered by the claims unless these claims by their language expressly state otherwise.

The invention claimed is:

1. A narrow vehicle comprising:
   A) a width that is in between forty to fifty-eight inches, said width being a non-adjustable width,
   B) a floor and a plurality of seats,
   C) a plurality of battery packs, or fuel cell tracks under said floor,
   D) wherein said seats are a driver seat only in a front seating row, and two seats forming a row of seats behind said driver seat,
   E) four wheels;
   wherein said narrow vehicle comprises a respective jet engine above respective ones of said wheels, said wheels further comprising propeller blades, as radials, said propeller blades rotating from parallel to said wheels to perpendicular to said wheels and operating as upward lifting propellers.

2. The vehicle according to claim 1, wherein said narrow vehicle further comprises a narrow vehicle parachute, and/or more than four said wheels and an attached modular passenger compartment comprising one or more said rows of seats.

3. The vehicle as in claim 2, having a back middle seat, a front seat, and a seat behind said front seat, wherein said front seat, and said back seat behind said front seat and in some cases said back middle seat, are replaced by material transportation structures and/or by equipment, and/or by fuel storage structures and/or are replaced by a single seat, wherein said single seat moves forward, backward, and reclines to a horizontal position as a lie-flat seat, or as a bed.

4. The vehicle according to claim 1, wherein said narrow vehicle is a highway vehicle, comprising a roof, a hood, and a trunk, wherein said roof, and/or said hood and/or said trunk further comprise solar panels, wherein said roof, and/or said hood and/or said trunk are constructed primarily by materials lighter than steel.

5. The vehicle according to claim 1, wherein said narrow vehicle, does not include a front passenger seat, does not include a front passenger door, and further comprises a window on said front passenger side, said driver seat, and said two seats in each of said back rows of seats, wherein said narrow vehicle further comprises one or more doors, and one or more said jet engines.

6. The vehicle according to claim 1, further comprising axles, wherein said axles and/or said wheels further comprising propeller blades, as radials and/or as blade attachments to said axles.

7. The vehicle according to claim 1, further comprising an engine having an engine size, wherein said engine is either a gas or a hybrid or an electric or a biofuel or a diesel or a hydrogen engine and/or a jet fuel engine, and/or jet fuel engines.

8. The vehicle according to claim 7, wherein said narrow vehicle further comprises a horizontal axis, two back wheels and two front wheels, and two or four respective jet engine enclosure structures above or above and laterally away respective ones of said wheels, wherein said jet engine enclosure structures may rotate downward by 5 to 25 degrees relative to said horizontal axis, wherein said narrow vehicle does not include said plurality of battery packs or fuel cell tracks under said floor.

9. The vehicle according to claim 8, wherein said narrow vehicle is constructed primarily with materials lighter than steel, wherein said narrow vehicle further comprises wings, wherein said wings further comprise extending and retracting smaller wings, stabilizers, flaps, slats, rotating up to 90 degrees, wherein said vehicle width of said narrow vehicle is adjusted by laterally extending and/or retracting said wings from said roof and/or from said floor and/or said hood and/or said trunk of said narrow vehicle.

10. The vehicle according to claim 1, wherein said narrow vehicle has a vehicle veracity and has a vehicle width, wherein said narrow vehicle further comprises a plurality of solar panels on said roof and/or said hood and/or said trunk of said narrow vehicle, wherein said roof and/or said hood and/or said trunk are constructed primarily by materials lighter than steel, wherein said narrow vehicle further comprises folding and unfolding exterior mirror casings, wherein said narrow vehicle is driverless said front seating row comprises two seats.

11. The vehicle according to claim 1, wherein said narrow vehicle has an interior and an exterior, and further comprises electronic and electrical inlets and/or outlets on said interior and/or on said exterior of said narrow vehicle, wherein said narrow vehicle is controlled and driven or driver assisted by an external or interior cellular telephone, and/or a computer tablet, or video game console or an Unmanned Aerial Vehicle, UAV, control console.

12. The vehicle as in claim 11, wherein said narrow vehicle does not have a back seating row, wherein said narrow vehicle further comprises only one door, and only one seat, and said wings, wherein said narrow vehicle does not include said plurality of battery packs or fuel cell tracks under said floor.

13. The vehicle as in claim 11, wherein said engine hood, and/or said trunk and/or said roof are primarily constructed by materials lighter than steel, wherein said narrow vehicle further comprises; said extending and retracting wings from said roof and/or from said floor and from said trunk, said one, two, or four jet engines, said narrow vehicle parachute, said lie-flat seat, said interior electrical and electronic inlets and outlets, said attached passenger compartment, wherein said narrow vehicle does not include said exterior mirror casings.

* * * * *